(12) United States Patent
Shatsky et al.

(10) Patent No.: US 11,609,854 B1
(45) Date of Patent: Mar. 21, 2023

(54) UTILIZING CHECKPOINTS FOR RESILIENCY OF METADATA IN STORAGE SYSTEMS

(71) Applicant: Dell Products L.P., Round Rock, TX (US)

(72) Inventors: Yosef Shatsky, Karnei Shomron (IL); Doron Tal, Geva Carmel (IL)

(73) Assignee: Dell Products L.P., Round Rock, TX (US)

( * ) Notice: Subject to any disclaimer, the term of this patent is extended or adjusted under 35 U.S.C. 154(b) by 21 days.

(21) Appl. No.: 17/512,890

(22) Filed: Oct. 28, 2021

(51) Int. Cl.
*G06F 12/08* (2016.01)
*G06F 12/0802* (2016.01)

(52) U.S. Cl.
CPC ...... *G06F 12/0802* (2013.01); *G06F 2212/60* (2013.01)

(58) Field of Classification Search
None
See application file for complete search history.

(56) References Cited

U.S. PATENT DOCUMENTS

| | | | |
|---|---|---|---|
| 5,381,539 A | 1/1995 | Yanai et al. | |
| 5,551,003 A | 8/1996 | Mattson et al. | |
| 5,764,880 A | 6/1998 | Gerdt et al. | |
| 6,052,799 A | 4/2000 | Li et al. | |
| 6,941,420 B2 | 9/2005 | Butterworth et al. | |
| 8,843,676 B2 | 9/2014 | Rajamanickam et al. | |
| 9,372,751 B2 | 6/2016 | McNutt | |
| 9,514,014 B2 | 12/2016 | Webman et al. | |
| 9,892,045 B1 | 2/2018 | Douglis et al. | |
| 10,078,598 B1 | 9/2018 | Wallace et al. | |
| 10,331,561 B1 | 6/2019 | Shilane et al. | |

(Continued)

FOREIGN PATENT DOCUMENTS

WO 2015108670 A1 7/2015
WO PCT/US2019/024885 1/2020

(Continued)

OTHER PUBLICATIONS

Dell EMC, "Dell EMC VxRack FLEX," Dell EMC Product Overview, 2018, 5 pages.

(Continued)

*Primary Examiner* — Tracy C Chan
(74) *Attorney, Agent, or Firm* — Ryan, Mason & Lewis, LLP

(57) ABSTRACT

Techniques are disclosed for utilizing checkpoints to achieve resiliency of metadata in a storage system. A storage control system writes metadata to a persistent write cache. The storage control system performs a checkpoint generation process to generate a new metadata checkpoint which includes at least a portion of the metadata in the persistent write cache. The checkpoint generation process comprises placing a lock on processing to enable metadata in the persistent write cache to reach a consistent state, creating a metadata checkpoint structure in memory, removing the lock on processing to allow metadata updates in the persistent write cache, destaging at least a portion of the metadata from the persistent write cache to the metadata checkpoint structure, and persistently storing the metadata checkpoint structure.

20 Claims, 6 Drawing Sheets

(56) References Cited

U.S. PATENT DOCUMENTS

| | | | |
|---|---|---|---|
| 10,445,180 | B2 | 10/2019 | Butterworth et al. |
| 10,986,174 | B1 | 4/2021 | Sharma et al. |
| 11,119,668 | B1 | 9/2021 | Keller et al. |
| 11,144,399 | B1 | 10/2021 | Yarimi et al. |
| 11,163,479 | B2 | 11/2021 | Lieblich et al. |
| 11,163,699 | B2 | 11/2021 | Keller et al. |
| 2002/0032835 | A1 | 3/2002 | Li et al. |
| 2008/0021853 | A1 | 1/2008 | Modha et al. |
| 2009/0204761 | A1 | 8/2009 | Caprioli et al. |
| 2009/0276593 | A1 | 11/2009 | Jacobson et al. |
| 2013/0305002 | A1 | 11/2013 | Hallak et al. |
| 2014/0215147 | A1 | 7/2014 | Pan |
| 2014/0215262 | A1 | 7/2014 | Li et al. |
| 2014/0244935 | A1 | 8/2014 | Ezra et al. |
| 2016/0103764 | A1 | 4/2016 | Banerjee et al. |
| 2018/0113640 | A1 | 4/2018 | Fernandez et al. |
| 2018/0267893 | A1 | 9/2018 | Barzik et al. |
| 2018/0300075 | A1 | 10/2018 | Fernandez et al. |
| 2019/0095283 | A1* | 3/2019 | Hu .................... G06F 11/1407 |
| 2019/0163587 | A1 | 5/2019 | Anna et al. |
| 2019/0227845 | A1 | 7/2019 | Sridhar et al. |
| 2019/0324866 | A1* | 10/2019 | Bensberg ............ G06F 16/128 |
| 2020/0133503 | A1 | 4/2020 | Sun et al. |
| 2021/0279187 | A1 | 9/2021 | Puder et al. |
| 2021/0294505 | A1 | 9/2021 | Keller et al. |
| 2021/0294774 | A1 | 9/2021 | Keller et al. |
| 2021/0294775 | A1 | 9/2021 | Keller et al. |
| 2021/0303160 | A1 | 9/2021 | Lieblich et al. |
| 2021/0303169 | A1 | 9/2021 | Tagar et al. |
| 2021/0303202 | A1 | 9/2021 | Ben Zeev et al. |
| 2021/0303401 | A1 | 9/2021 | Yarimi et al. |
| 2021/0303407 | A1 | 9/2021 | Keller et al. |
| 2021/0303480 | A1 | 9/2021 | Keller et al. |
| 2022/0342816 | A1* | 10/2022 | Derzhavetz ......... G06F 12/0868 |
| 2022/0398034 | A1* | 12/2022 | Alkalay ................ G06F 3/0604 |

FOREIGN PATENT DOCUMENTS

| | | |
|---|---|---|
| WO | PCT/US2019/024900 | 1/2020 |
| WO | 2020204880 A1 | 10/2020 |
| WO | 2020204882 A1 | 10/2020 |

OTHER PUBLICATIONS

G. Soundararajan et al., "Dynamic Resource Allocation for Database Servers Running on Virtual Storage," FAST 2009: Proceedings of the 7th conference on File and storage technologies, Feb. 2009, pp. 71-84.

Dell EMC, "EMC ScaleIO Basic Architecture Documentation," Technical White Paper, Mar. 2017, 22 pages.

EMC2, "EMC ScaleIO Design Considerations and Best Practices," Technical White Paper, Jun. 2016, 30 pages.

I. Koltsidas et al., "SoftwAre Log-Structured Array (SALSA)—A Unified Stack for SSDs and SMR Disks," IBM Research Report, Dec. 2, 2015, 13 pages.

S. M. Rumble et al., "Log-Structured Memory for DRAM-Based Storage," Proceedings of the 12th USENIX Conference on File and Storage Technologies, Santa Clara, CA, Feb. 17-20, 2014, 17 pages.

Dell EMC, "Dell EMC VxFlex Family Overview," Technical White Paper, May 2019, 44 pages.

J. Nakano et al., "ReViveI/O: Efficient Handling of I/O in Highly-Available Rollback-Recovery Servers," HPCA, 10.1109/2006.1598129, pp. 200-211.

Wikipedia, "Raft (Computer Science)," https://en.wikipedia.org/wiki/Raft_(computer_science), Feb. 10, 2020, 4 pages.

Wikipedia, "Paxos (ComputerScience)," https://en.wikipedia.org/wiki/Paxos_(computer_science), Dec. 6, 2019, 21 pages.

Wikipedia, "State Machine Replication," https://en.wikipedia.org/wiki/State_machine_replication, Dec. 14, 2019, 9 pages.

Dell Technologies, "Dell EMC PowerFlex: Secure Snapshots," Technical White Paper, Jul. 2020, 17 pages.

Dell Technologies, "Dell EMC PowerFlex: Protected Maintenance Mode," Technical White Paper, Jul. 2020, 20 pages.

Dell Technologies, "Dell EMC PowerFlex: Introduction to Replication," Technical White Paper, Jun. 2020, 34 pages.

Dell Technologies, "Dell EMC PowerFlex: Networking Best Practices and Design Considerations," Best Practices, Jun. 2020, 64 pages.

Dell EMC, "Getting To Know Dell EMC PowerFlex," Version 3.5.x, Rev. 02, Jan. 2021, 66 pages.

U.S. Appl. No. 16/888,742 filed in the name of Rivka Matosevich et al., filed May 31, 2020, and entitled "Balancing Resiliency and Performance by Selective Use of Degraded Writes and Spare Capacity in Storage Systems."

U.S. Appl. No. 16/918,654 filed in the name of Rivka Matosevich et al., filed Jul. 1, 2020, and entitled "Sharing Memory Resources Between Asynchronous Replication Workloads."

U.S. Appl. No. 16/983,423 filed in the name of Dan Aharoni et al., filed Aug. 3, 2020, and entitled "Deferred Reclamation of Invalidated Entries that are Associated with a Transaction Log in a Log-Structured Array."

U.S. Appl. No. 17/065,754 filed in the name of Dan Aharoni et al., filed Oct. 8, 2020, and entitled "Direct Response to IO Request in Storage System with Remote Replication."

U.S. Appl. No. 17/070,073 filed in the name of Dan Aharoni et al., filed Oct. 14, 2020, and entitled "Direct Response to IO Request in Storage System Having an Intermediary Target Apparatus."

U.S. Appl. No. 17/070,288 filed in the name of Anurag Sharma et al., filed Oct. 14, 2020, and entitled "Pipeline-Based System for Configuration Checking and Reporting Associated with an Information Processing System."

U.S. Appl. No. 17/071,407 filed in the name of John Moran et al., filed Oct. 15, 2020, and entitled "Dynamic Remediation Actions in Response to Configuration Checks in an Information Processing System."

U.S. Appl. No. 17/077,105 filed in the name of Yosef Shatsky et al., filed Oct. 22, 2020, and entitled "Volume Tiering in Storage Systems."

U.S. Appl. No. 17/106,988 filed in the name of Rivka Matosevich et al., filed Nov. 30, 2020, and entitled "Managing Host Connectivity to a Data Storage System."

U.S. Appl. No. 17/123,525 filed in the name of Itay Keller et al., filed Dec. 16, 2020, and entitled "Deferred Reclamation of Invalidated Entries Associated with Replication in a Log-Structured Array."

U.S. Appl. No. 17/145,646 filed in the name of Yosef Shatsky et al., filed Jan. 11, 2021, and entitled "Redistribution of Processing Groups between Server Nodes Based on Hardware Resource Utilization."

U.S. Appl. No. 17/232,203 filed in the name of Roman Spiegelman, filed Apr. 16, 2021, and entitled "Object Synchronization of Server Nodes in a Network Computing Environment."

U.S. Appl. No. 17/236,256 filed in the name of Doron Tai et al., filed Apr. 21, 2021, and entitled "Recovery from Partial Device Error in Data Storage System."

U.S. Appl. No. 17/306,601 filed in the name of Rivka Matosevich et al., filed May 3, 2021, and entitled "Managing Replication Journal in a Distributed Replication System."

U.S. Appl. No. 17/308,166 filed in the name of Adi Bar Shalom et al., filed May 5, 2021, and entitled "Journal Barrier Consistency Determination."

U.S. Appl. No. 17/351,733 filed in the name of Yosef Shatsky et al., filed Jun. 18, 2021, and entitled "Data Deduplication in a Disaggregated Storage System."

U.S. Appl. No. 17/361,666 filed in the name of Yosef Shatsky et al., filed Jun. 29, 2021, and entitled "Tracking Utilization of Data Blocks in a Storage System."

* cited by examiner

500

UTILIZING CHECKPOINTS FOR RESILIENCY OF METADATA IN STORAGE SYSTEMS

TECHNICAL FIELD

This disclosure relates generally to data storage management techniques and, more particularly, to techniques for providing resiliency of metadata in a data storage system.

BACKGROUND

Storage systems utilize some form of internal layout for a physical data layer, and employ a mapping mechanism from a logical layer (as understood by user volumes or files) to a physical layer that is used to store data. A storage controller may arrange data in the physical layer using various methods such as, e.g., packing data to conserve capacity, implementing a log-structured array, storage tiering, etc. In addition, storage systems require various types of metadata to support core storage functionality. Such metadata includes, e.g., metadata for mapping logical locations (offset in a file or volume) to a physical location (to track the physical location of stored data items), invalidation and garbage collection related metadata, accounting, deduplication referencing, snapshot generations and relationships, and resiliency related metadata (e.g., RAID), etc. The metadata must be resilient to failures such as a device or a node going offline, because without the metadata, the stored data become inaccessible and key functionality breaks. In addition, the process of persisting metadata should not add a significant amount of bandwidth or IOPS (input/output operations per second) which degrades system performance and affects the endurance of storage devices used to store the metadata. In this regard, efficient metadata management is critical to overall performance of a data storage system.

SUMMARY

Exemplary embodiments of the disclosure include techniques for utilizing checkpoints to achieve resiliency of metadata in a storage system. An exemplary embodiment includes a method that is performed by a storage control system. The storage control system writes metadata to a persistent write cache. The storage control system performs a checkpoint generation process to generate a new metadata checkpoint which includes at least a portion of the metadata in the persistent write cache. The checkpoint generation process comprises placing a lock on processing to enable metadata in the persistent write cache to reach a consistent state, creating a metadata checkpoint structure in memory, removing the lock on processing to allow metadata updates in the persistent write cache, destaging at least a portion of the metadata from the persistent write cache to the metadata checkpoint structure, and persistently storing the metadata checkpoint structure.

Other embodiments of the disclosure include, without limitation, systems and articles of manufacture comprising processor-readable storage media, which are configured for utilizing checkpoints to achieve resiliency of metadata in a storage system.

DETAILED DESCRIPTION

Exemplary embodiments of the disclosure will now be discussed in further detail with regard to systems and methods for utilizing checkpoints to achieve resiliency of metadata in a storage system. For purposes of illustration, exemplary embodiments will be described herein with reference to exemplary network computing environments, such as distributed storage environments, which implement data processing systems and associated computers, servers, storage devices and other processing devices. It is to be appreciated, however, that these and other embodiments are not restricted to the particular illustrative system and device configurations shown. Accordingly, the term "network computing environment" as used herein is intended to be broadly construed, so as to encompass, for example, processing systems comprising cloud computing and storage systems, as well as other types of processing systems comprising various combinations of physical and virtual processing resources. A network computing environment may therefore comprise, for example, at least one data center or other cloud-based systems that include one or more cloud systems that host multiple tenants which share cloud resources. Numerous different types of enterprise computing and storage systems are also encompassed by the term "network computing environment" as that term is broadly used herein.

Figure 1:
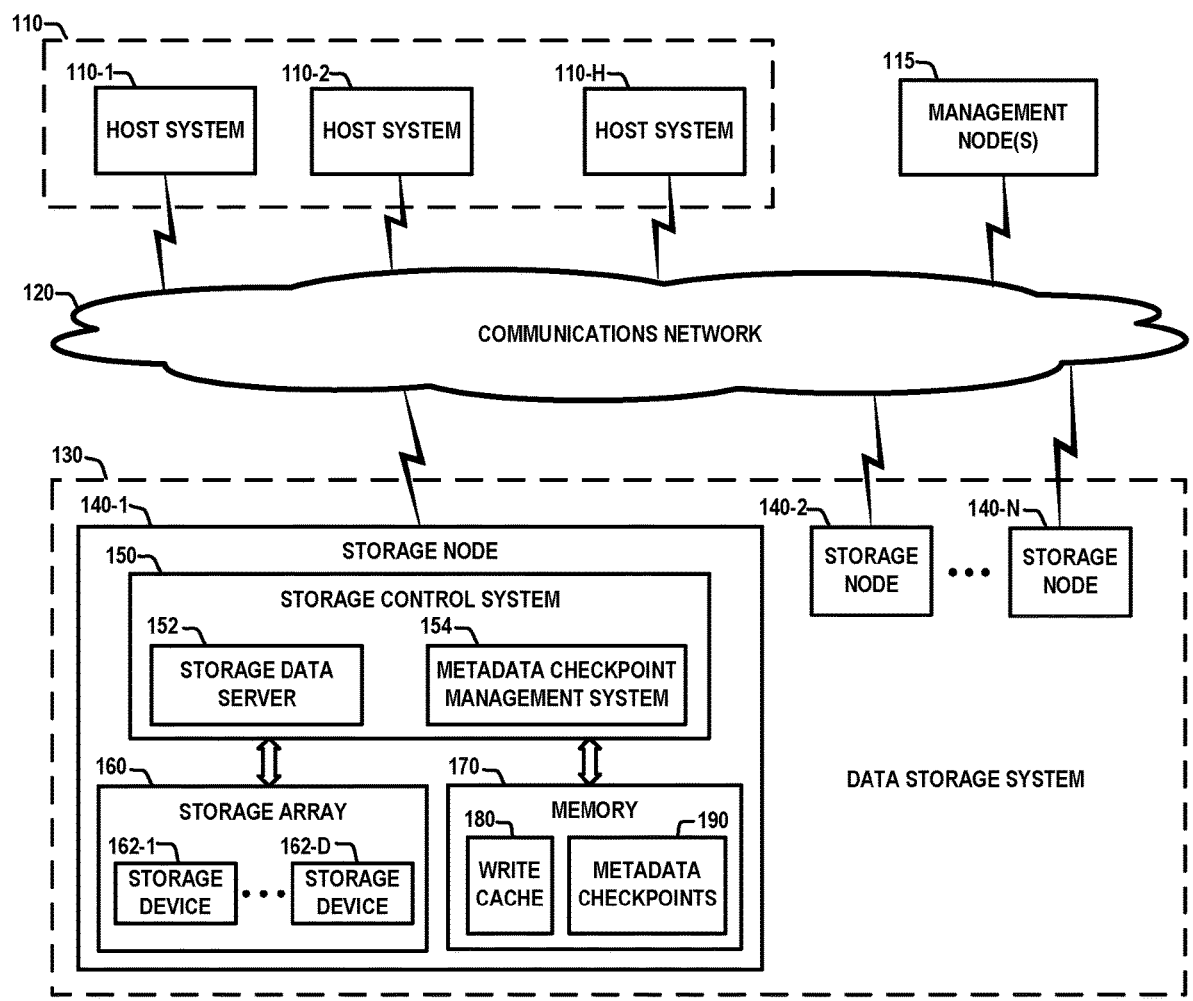
FIG. 1 schematically illustrates a network computing system comprising a data storage system which implements a metadata checkpoint management system, according to an exemplary embodiment of the disclosure.

FIG. 1 schematically illustrates a network computing system comprising a data storage system which implements a metadata checkpoint management system, according to an exemplary embodiment of the disclosure. The network computing system 100 comprises one or more host systems 110-1, 110-2, ... 110-H (collectively, host systems 110), one or more management nodes 115, a communications network 120, and a data storage system 130. The data storage system 130 comprises one or more storage nodes 140-1, 140-2, ..., 140-N (collectively, storage nodes 140). As shown in FIG. 1, the storage node 140-1 comprises a storage control system 150, a storage array 160 (e.g., primary storage) comprising a plurality of storage devices 162-1, ..., 162-D (collectively, storage devices 162), and primary memory 170 (alternatively, system memory 170). The primary memory 170 comprises volatile random-access memory (RAM) and non-volatile RAM (NVRAM). The storage control system 150 comprises a storage data server 152, and a metadata checkpoint management system 154. In some embodiments, the primary memory 170 is configured to implement a persistent write cache 180, and persistently store metadata checkpoints 190.

The metadata checkpoint management system 154 implements methods that are configured to generate and manage the metadata checkpoints 190 by, e.g., capturing a consistent state of storage metadata associated with the storage array 160 using checkpoints and, thereby achieving resiliency of the storage metadata. In some embodiments, the other storage nodes 140-2 . . . 140-N have the same or similar configuration as the storage node 140-1 shown in FIG. 1. In some embodiments, the scope of the storage metadata included in the metadata checkpoints 190 does not include all the storage metadata in the data storage system 130. The storage metadata of the data storage system 130 is divided into sections, where each section is located on a different storage node in the data storage system 130. In this instance, the host/user I/O is distributed to these sections of storage metadata based on the position of the I/O or based on a hash of the I/O. In this regard, a given metadata checkpoint will be scoped to a single section of the storage metadata. For example, the metadata checkpoints 190 of the of the storage node 140-1 will be scoped to the section of storage metadata that is utilized by the storage control system 150 to access data in the storage array 160.

In general, the management nodes 115 implement application programming interfaces (APIs) to enable manual, automated, and/or semi-automated configuration, management, provisioning, and monitoring of the data storage system 130 and the associated storage nodes 140. In some embodiments, the management nodes 115 comprise stand-alone dedicated management server nodes, which may comprise physical and/or virtual server nodes.

The host systems 110 comprise physical server nodes and/or virtual server nodes which host and execute applications that are configured to process data and execute tasks/workloads and perform computational work, either individually, or in a distributed manner, to thereby provide compute services to one or more users (the term "user" herein is intended to be broadly construed so as to encompass numerous arrangements of human, hardware, software or firmware entities, as well as combinations of such entities). In some embodiments, the host systems 110 comprise application servers, database servers, etc. The host systems 110 can include virtual nodes such as virtual machines and container systems. In some embodiments, the host systems 110 comprise a cluster of computing nodes of an enterprise computing system, a cloud-based computing system, or other types of computing systems or information processing systems comprising multiple computing nodes associated with respective users. The host systems 110 issue data access requests to the data storage system 130, wherein the data access requests include (i) write requests to store data in the storage arrays 160 of the storage nodes 140 and (ii) read requests to access data that is stored in the storage arrays 160 of the storage nodes 140.

The communications network 120 is configured to enable communication between the host systems 110 and the storage nodes 140, and between the management nodes 115, the host systems 110, and the storage nodes 140, as well as to enable peer-to-peer communication between the storage nodes 140 of the data storage system 130. In this regard, while the communications network 120 is generically depicted in FIG. 1, it is to be understood that the communications network 120 may comprise any known communications network such as, a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., IP-based or Fiber Channel storage fabric), or various portions or combinations of these and other types of networks. In this regard, the term "network" as used herein is therefore intended to be broadly construed so as to encompass a wide variety of different network arrangements, including combinations of multiple networks possibly of different types, which enable communication using, e.g., Transfer Control Protocol/Internet Protocol (TCP/IP) or other communication protocols such as Fibre Channel (FC), FC over Ethernet (FCoE), Internet Small Computer System Interface (iSCSI), Peripheral Component Interconnect express (PCIe), InfiniBand, Gigabit Ethernet, etc., to implement I/O channels and support storage network connectivity. Numerous alternative networking arrangements are possible in a given embodiment, as will be appreciated by those skilled in the art.

The data storage system 130 may comprise any type of data storage system, or combination of data storage systems, including, but not limited to, a storage area network (SAN) system, a network-attached storage (NAS) system, a direct-attached storage (DAS) system, dynamic scale-out data storage systems, or other types of distributed data storage systems comprising software-defined storage, clustered or distributed virtual and/or physical infrastructure. The term "data storage system" as used herein should be broadly construed and not viewed as being limited to storage systems of any particular type or types. It is to be noted that each storage node 140 and its associated storage array 160 is an example of what is more generally referred to herein as a "storage system" or a "storage array." The storage nodes 140 can be physical nodes, virtual nodes, and a combination of physical and virtual nodes.

In some embodiments, the storage nodes 140 comprise storage server nodes (e.g., server node 600, shown in FIG. 6) having processors and system memory, and possibly implementing virtual machines and/or containers, although numerous other configurations are possible. In some embodiments, one or more of the storage nodes 140 can additionally implement functionality of a compute node, and vice-versa, wherein a compute node is configured to process data and execute tasks/workloads and perform computational work, either individually, or in a distributed manner, to thereby provide compute services such as execution of one or more applications on behalf of one or more users. In this regard, the term "storage node" as used herein is therefore intended to be broadly construed, and a storage system in some embodiments can be implemented using a combination of storage nodes and compute nodes.

In some embodiments, each storage node 140 comprises a server node that is implemented on, e.g., a physical server machine or storage appliance comprising hardware processors, system memory, and other hardware resources that execute software and firmware to implement the functionalities and data management services of the storage node 140 and the storage control system 150, as discussed herein. More specifically, in some embodiments, each storage node 140 comprises a plurality of storage control processors which execute a lightweight operating system (e.g., a customized lightweight Linux kernel) and functional software (e.g., software-defined storage software) to implement various functions of the storage node 140 and the storage control system 150, wherein such functions include, but are not limited to, (i) managing and executing data access requests issued by the host systems 110, (ii) performing various data management and storage services, and (iii) controlling network communication and connectivity with the host systems 110 and between the storage nodes 140 within the data storage system 130, etc.

In a distributed storage environment, the storage control systems 150 of the storage nodes 140 are configured to communicate in a cooperative manner to perform functions such as e.g., processing data access requests received from the host systems 110, aggregating/pooling the storage capacity of the storage arrays 160 of the storage nodes 140, performing functions such as inline data compression/decompression, data deduplication, thin provisioning, and data protection functions such as data replication, snapshot, and data protection and resiliency schemes based on data striping and/or parity (e.g., erasure coding, RAID, etc.), and other types of data management functions, depending on the system configuration.

The storage devices 162 comprise one or more of various types of storage devices such as hard-disk drives (HDDs), solid-state drives (SSDs), Flash memory cards, or other types of non-volatile memory (NVM) devices including, but not limited to, non-volatile random-access memory (NVRAM), phase-change RAM (PC-RAM), magnetic RAM (MRAM), etc. In some embodiments, the storage devices 162 comprise flash memory devices such as NAND flash memory, NOR flash memory, etc. The NAND flash memory can include single-level cell (SLC) devices, multi-level cell (MLC) devices, triple-level cell (TLC) devices, or quad-level cell (QLC) devices. These and various combinations of multiple different types of storage devices may be implemented in the data storage system 130. In this regard, the term "storage device" as used herein should be broadly construed to encompass all types of persistent storage media including hybrid drives.

In some embodiments, the storage array 160 of a given storage node 140 comprises DAS resources (internal and/or external), wherein the storage control system 150 of the given storage node 140 is configured to directly access the storage array 160 of the given storage node 140. In some embodiments, the data storage system 130 comprises a disaggregated data storage system in which storage data processing is separate from data storage. More specifically, in an exemplary embodiment of a disaggregated storage system, the storage control systems 150 comprise storage control nodes, and the storage arrays 160 comprise storage nodes, which are separate from the storage control nodes. In such configuration, the storage control systems 150 are configured to handle the processing of data associated with data access requests (i.e., input/output (I/O) read and write requests), and the storage arrays 160 are configured to handle writing/reading data to/from respective storage devices 162. In a disaggregated architecture, each storage control system 150 would be configured to directly access data stored in each storage array 160 in the data storage system 130. The disaggregated storage system architecture essentially separates the storage control compute layers (e.g., storage control systems 150) from the data storage layers (e.g., storage arrays 160).

In a disaggregated data storage system, each storage array 160 is implemented as, e.g., an external DAS device, wherein each storage control system 150 of each storage node 140-1, 140-2, . . . , 140-N is connected to each storage array 160 using any suitable interface protocol such as Small Computer Systems Interface (SCSI), Fibre Channel (FC), etc. In other embodiments, the storage control systems 150 of the storage nodes 140-1, 140-2, . . . , 140-N can be network-connected to each of the storage arrays 160 (via a high-performance network fabric) using any suitable network configuration and network interface protocol such as Ethernet, FC, Internet Small Computer Systems Interface (iSCSI), InfiniBand, etc. For example, in some embodiments, the storage control systems 150 and the storage arrays 160 are interconnected in a full-mesh network, wherein back-end interconnectivity is achieved using, e.g., a redundant high-speed storage fabric, wherein the storage control systems 150 can utilize remote procedure calls (RPC) for control messages and remote direct memory access (RDMA) for accessing data blocks.

In some embodiments, the storage data servers 152 of the storage nodes 140 are configured to consolidate the capacity of the storage arrays 160 (e.g., HDDs, SSDs, PCIe or NVMe flash cards, etc.) of the storage nodes 140 into storage pools from which logical volumes are allocated, wherein the logical volumes (e.g., a block unit of storage management) are identified by, e.g., logical unit numbers (LUNs). More specifically, the storage data servers 152 of the storage nodes 140 are configured to create and manage storage pools (e.g., virtual pools of block storage) by aggregating storage capacity of the storage arrays 160 of the storage nodes 140 and dividing a given storage pool into one or more volumes, wherein the volumes are exposed to the host systems 110 as block devices. For example, a virtual block device can correspond to a volume of a storage pool. Each virtual block device comprises any number of actual physical storage devices, wherein each block device is preferably homogenous in terms of the type of storage devices that make up the block device (e.g., a block device can include only HDD devices or SSD devices, etc.).

In some embodiments, each host system 110 comprises a storage data client (SDC) which executes on the host system and which consumes the block storage exposed by the storage data servers 152. In particular, an SDC comprises a lightweight block device driver that is deployed on a given host system 110 to expose shared block volumes to the given host system 110. The SDC exposes the storage volumes as block devices to each application (e.g., virtual machine, container, etc.) that execute on the same server (e.g., host system 110) on which the SDC is installed. The SDC of a given host system 110 exposes block devices representing the virtual storage volumes that are currently mapped to the given host system 110. The SDC for a given host system 110 serves as a block driver for the host system 110, wherein the SDC intercepts I/O requests, and utilizes the intercepted I/O request to access the block storage that is managed by the storage data servers 152. The SDC provides the operating system or hypervisor (which runs the SDC) access to the logical block devices (e.g., volumes). Each SDC has knowledge of which storage data servers 152 hold (e.g., own) their block data, so multipathing can be accomplished natively through the SDCs.

As noted above, the management nodes 115 in FIG. 1 implement a management layer which manages and configures the network computing system 100. In some embodiments, the management nodes 115 comprise a tightly-coupled cluster of manager nodes that are configured to supervise the operations of the storage cluster and manage storage cluster configurations. For example, management nodes 115 include metadata manager (MDM) modules that operate outside of the data path and provide the relevant information to the SDCs and the storage data servers 152 to allow such components to control data path operations. The MDM modules are configured to manage the mapping of SDCs to the storage data servers 152 of the storage nodes 140. The MDM modules manage various types of metadata that are required to perform various management operations in the storage environment such as, e.g., managing configuration changes, managing the SDCs and storage data servers 152, maintaining and updating device mappings, maintaining management metadata for controlling data protection operations such as snapshots, replication, RAID configurations, etc., managing system capacity including device allocations and/or release of capacity, performing operation for recovery from errors and failures, and system rebuild tasks including rebalancing, etc.

The metadata checkpoint management system 154 is configured to utilize the persistent write cache 180 and the metadata checkpoints 190 to persist metadata of the storage system. The persistent write cache 180 and the metadata checkpoints 190 are maintained in a persistence storage/memory resource. In the context of a software-defined storage system, the storage control system 150 is essentially a hardware independent storage control system which is configured to abstract storage and memory resources from the underlying hardware platform for greater flexibility, efficiency and faster scalability. In this regard, the storage control system 150 will have no control over the types of storage and memory hardware resources that will be utilized during run-time. In this regard, in some embodiments, the persistent write cache 180 and the metadata checkpoints 190 are implemented in primary memory 170. In other embodiments, the persistent write cache 180 and/or the metadata checkpoints 190 can be implemented in primary storage (e.g., the storage array 160).

As noted above, the primary memory 170 comprises volatile RAM such as dynamic RAM (DRAM), synchronous DRAM (SDRAM), etc. In some embodiments, the primary memory 170 comprises non-volatile memory which is configured as RAM. For example, in some embodiments, the primary memory 170 comprises a storage class memory (SCM) tier which extends the RAM that is available to the operating system of the storage node 140. The SCM tier can be implemented with various types of non-volatile memory media hardware such as persistent memory (PMEM) modules, solid-state drive (SSD) devices, nonvolatile dual in-line memory modules (NVDIMMs), and other types of persistent memory modules with a DRAM form factor, etc. In addition, the persistent memory may be implemented using a vaulting RAM system which comprises a battery-backed RAM in which data is stored to vault devices upon device or power failure. In general, the non-volatile memory devices can be accessed over a memory bus (implemented via, e.g., Peripheral Component Interconnect Express) using a suitable interface such as non-volatile memory express (NVMe).

The metadata checkpoint management system 154 is configured capture a consistent state of storage metadata using checkpoints. In some embodiments, the metadata checkpoint management system 154 implements methods that are configured to perform a checkpoint generation process to generate metadata checkpoints using metadata that is initially stored and accumulated in the persistent write cache 180. For example, in some embodiments, a checkpoint generation process comprises (i) placing a lock on processing to enable metadata in the persistent write cache to reach a consistent state, (ii) creating a metadata checkpoint structure in memory, (iii) destaging at least a portion of the metadata from the persistent write cache to the metadata checkpoint structure, (iv) removing the lock on processing to allow metadata updates in the persistent write cache, and (v) persistently storing the metadata checkpoint structure. Exemplary systems and methods for generating and managing metadata checkpoints will be discussed in further detail in conjunction with FIGS. 2-5.

Figure 2:
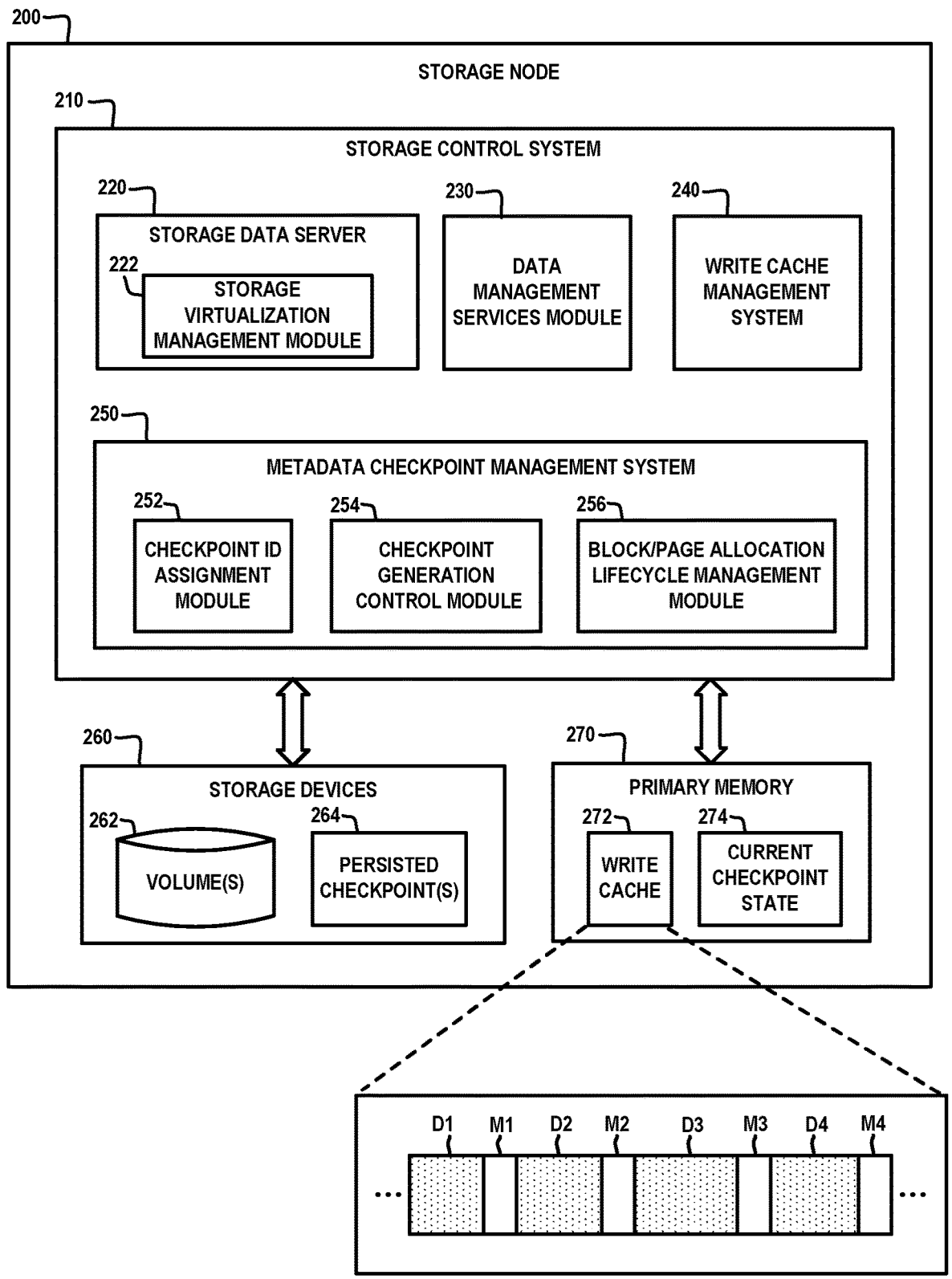
FIG. 2 schematically illustrates a storage node which comprises a metadata checkpoint management system, according to an exemplary embodiment of the disclosure.

FIG. 2 schematically illustrates a storage node 200 which comprises a metadata checkpoint management system, according to an exemplary embodiment of the disclosure. In some embodiments, FIG. 2 schematically illustrates an exemplary architecture of the storage nodes 140 of the data storage system 130 of FIG. 1. As shown in FIG. 2, the storage node 200 comprises a storage control system 210 which implements a storage data server 220, a data management services module 230, a write cache management system 240, and a metadata checkpoint management system 250. The storage data server 220 comprises a storage virtualization management module 222. The write cache management system 240 comprises various functional modules including, but not limited to, a write cache destage control module, the functions of which will be explained in further detail below. The metadata checkpoint management system 250 comprises various functional modules including, but not limited to, a checkpoint identifier (ID) assignment module 252, a checkpoint generation control module 254, and a block/page allocation lifecycle management module 256.

The storage node 200 further comprises an array of storage devices 260 and primary memory 270. The storage devices 260 comprise primary storage resources, wherein at least some capacity of the storage devices 260 is partitioned into one or more storage volumes 262. Furthermore, in some embodiments, some capacity of the storage devices 260 is allocated to store one or more persisted metadata checkpoints 264 which are generated and managed by the metadata checkpoint management system 250 using techniques as discussed herein. In the exemplary embodiment of FIG. 2, the primary memory 270 comprises a persistent write cache 272 which is provisioned and managed by the write cache management system 240. In some embodiments, the persistent write cache 272 resides in a region of non-volatile RAM (e.g., PMEM memory, SSD memory, etc.), which is allocated for the persistent write cache 272. In other embodiments, the persistent write cache 272 resides in an allocated region of the storage space of the storage devices 260. As further shown in FIG. 2, the primary memory 270 includes a current checkpoint state 274 which is maintained in RAM in a non-persisted state during a checkpoint generation process implemented by the checkpoint generation control module 254. In some embodiments, some capacity of non-volatile memory devices of the primary memory 270 may be utilized to store the persisted metadata checkpoint(s) 264.

The storage data server 220 implements functions as discussed above such as processing I/O write and read requests received from host systems to write/read data to/from the storage devices 260. The storage virtualization management module 222 implements any suitable logical volume management (LVM) system which is configured to create and manage the storage volumes 262 by aggregating the capacity of the storage devices 260 into one or more virtual storage pools that are thin-provisioned for maximum capacity, and logically dividing each storage pool into one or more storage volumes 262 that are exposed as block devices (e.g., LUNs) to the applications or host systems 110 (FIG. 1) which consume the data.

The data management services module 230 implements one or more types of data management services including, but not limited to, inline data compression/decompression, thin provisioning, and data protection functions such as data replication, data backup, data snapshot, and data protection and resiliency schemes based on data striping and/or parity (e.g., erasure coding, RAID, etc.), and other types of data management functions, depending on the system configuration. In embodiments where the storage data server 220 abstracts the physical media (e.g., storage devices 260) and presents logical (virtualized) addresses to users in the form of LUNs, the storage data server 220 generates metadata to provide mapping between logical addresses and physical addresses. In addition, the storage control system 210 generates and manages storage metadata which is utilized for managing snapshots, change tracking for remote replication, managing deduplication pointers, managing data compression, resiliency related metadata (e.g., RAID), etc. The metadata checkpoint management system 250 generates metadata checkpoints to capture consistent states of the storage metadata generated by the storage control system 210 and, thereby, ensure resiliency of the storage metadata.

The write cache management system 240 implements methods that are configured to provision and manage the persistent write cache 272 in the primary memory 270 or in primary storage as provided by the storage devices 260. In some embodiments, the persistent write cache 272 is utilized to serve I/O write requests by persistently storing data items (e.g., write data) together with associated metadata items in the persistent write cache 272. For example, as shown in FIG. 2, the persistent write cache 272 comprises a plurality of data items D1, D2, D3, and D4, and a plurality of associated metadata items M1, M2, M3, and M4. In some embodiments, the data and associated metadata items in the persistent write cache 272 are written to the write cache using out-of-place writes based on an order in which user writes are received by the storage control system 210. For example, the data items D1 and D4 can represent a block of data that is associated with a given offset location in a storage volume, but wherein the data item D4 and associated metadata item M4 represent an updated/modified version of a data block associated with data item D1 and associated metadata item Ml. During a metadata checkpoint operation in which metadata items are destaged from the persistent write cache 272 and applied to a current checkpoint being created, resiliency of the metadata items is provided by the persistent write cache 272 until the destaged metadata items are persisted in a new persistent metadata checkpoint. In this instance, the cached metadata items are no longer needed, and can be removed from the persistent write cache 272.

In this regard, the persistent write cache 272 reduces the overhead for handling write data and associated metadata since the write data and associated metadata is initially persisted in the persistent write cache 272 (via out-of-place writes) without the need for extra I/O to store the metadata items separately from the data items. In addition, when the storage control system 210 receives an I/O write request and associated write data from a given host system, the storage control system 210 will send an acknowledgment to the host system to indicate that the write data is successfully written to the primary storage, in response to the received write data and associated metadata being stored in the persistent write cache 272.

In some embodiments, the persistent write cache 272 is implemented as a cyclic buffer, wherein items (e.g., data items and metadata items) are always written to a head location of the persistent write cache 272, and items are destaged from a tail location of the persistent write cache 272. With this scheme, the items in the persistent write cache 272 are arranged in a cyclic write order from a tail location of the persistent write cache 272 to the head location of the persistent write cache 272. Further, in some embodiments, the write cache management system 240 utilizes a plurality of pointers in conjunction with the persistent write cache 272 (e.g., cyclic write cache) to (i) determine a tail location and head location of the write cache, (ii) determine a location in the persistent write cache 272 from where a recovery process begins, and to (iii) keep track of the data items and metadata items that destaged from the tail of the persistent write cache 272 via destage operations performed by a destage control module of the write cache management system 240. The write cache management system 240 implements write cache eviction/destaging operations which take into consideration that the persistent write cache 272 comprises both data items and associated metadata items, which are separate entities that are persisted in different primary data structures. In some embodiments, write cache management system 240 is configured to destage data items and destage metadata items, separately, based on associated eviction/destaging policies.

The metadata checkpoint management system 250 is configured to generate metadata checkpoints using metadata items destaged from the persistent write cache 272. A metadata checkpoint is a consistent state of metadata that is resilient. The metadata checkpoint management system 250 implements various methods to effectively create such metadata checkpoints. For example, the metadata checkpoint management system 250 is configured to persist the dirty metadata of a checkpoint from RAM to persistent storage while at the same time allowing the storage control system to serve host/user I/Os that may modify storage metadata. In addition, checkpoint techniques are implemented to ensure a consistent metadata state by providing an atomic transition between checkpoints. In particular, changes in the persistent write cache 272 are not assumed to be idempotent. As such, the metadata checkpoint management system 250 is configured to prevent a metadata change from being included in both a checkpoint and the persistent write cache 272, and to allow a metadata change to not be included in either a checkpoint or the persistent write cache 272. The metadata checkpoint management system 250 is configured to control (via the block/page allocation lifecycle management module 256) resource allocation for resources that are needed to create checkpoints. In the event of a failure during a metadata checkpoint process, the metadata checkpoint management system 250 allows the system to revert back to a previous metadata checkpoint to enable recovery.

The metadata checkpoint management system 250 is configured to retain at least one previous checkpoint at any given time even when creating a new checkpoint. Once a new checkpoint is created, a previous checkpoint can be deleted if not needed. In some embodiments, the metadata checkpoint management system 250 is configured to generate two or more metadata checkpoints which share metadata content that was not changed between the checkpoints. Indeed, between checkpoints, most of the metadata will not change and so it is inefficient and impractical to require rewriting all the metadata in every checkpoint.

The metadata checkpoint management system 250 utilizes the checkpoint ID assignment module 252 to assign a unique checkpoint ID to each checkpoint that is created over time. In some embodiments, the checkpoint IDs are incremental and continuously increased such that a newly created checkpoint will always have a higher checkpoint ID value than a previously created checkpoint. In some embodiments, the checkpoint ID assignment module 252 implements a checkpoint ID counter which is incremented by one for each checkpoint that is created, e.g., when a new data checkpoint is created, the new checkpoint is assigned a numerical value which is increment by +1 relative to the previous checkpoint ID value. In some embodiments, the checkpoint ID counter is an n-bit counter in which n is selected such that the checkpoint ID counter does not overflow over the anticipated lifespan of the data storage system. All metadata is associated with a checkpoint ID, even if the checkpoint was not created yet. For example, in a new system that has not created a new checkpoint, all the metadata is associated with checkpoint ID #0. Eventually, checkpoint ID #0 is closed and persisted, wherein all new changes are associated with the next checkpoint ID #1.

In some embodiments, the metadata checkpoint management system 250 is configured to construct checkpoints using pages of metadata to allow for swapping of metadata in and out of memory, and to enable a checkpoint to persist only modified areas of the metadata. In particular, metadata checkpoints are constructed using pages of metadata, wherein a page comprises a unit of capacity that is allocated to a metadata checkpoint structure and can be written to storage (e.g., 4 KB, 8 KB, etc.). Further out-of-place write operations are performed (as opposed to write-in-place operations) so that any modification of a page creates a new page which is written to a new location in storage. Every page comprises a header which comprises a checkpoint ID that indicates which checkpoint the page was last updated during creation of the checkpoint. The checkpoint ID of the page is utilized for both I/O path and page management.

In some embodiments, the metadata checkpoint management system 250 is configured to provide atomic transition between checkpoints. For example, in some embodiments, the transition between checkpoints is performed by a single atomic write of a "commit page." A commit page comprises information that is needed to put a new checkpoint into effect and expire a previous checkpoint, as well as determine a cutoff point of the persistent write cache 272 with regard to metadata items to include in a current checkpoint, and metadata items to include in the next checkpoint to be created. In some embodiments, the commit page information comprises, e.g., (i) a checkpoint ID, (ii) the IDs of the root pages of all metadata structures, (iii) a cutoff point in the persistent write cache 272 up until which all the changes are included in the current checkpoint, and from which recovery will begin using the write cache after a failure, and (iv) a list of pages freed by the previous checkpoint. In the event of a failure, recovery is performed using, e.g., a last persisted metadata checkpoint, and by replaying recent metadata items in the persistent write cache 272.

In some embodiments, metadata is not needed to indicate where the commit page is located. Instead, the commit page is placed in a set of predefined locations, e.g., at least two locations for double buffering. As is known the art, double buffering is a programming technique that utilizes two buffers to increase computing speed to overlap I/O with processing, wherein data in one buffer are being processed while the next set of data is read into the other one. Within the set of pages, the system can identify the most recent commit page to use after a crash by reading the predefined set of pages and checking which has the most recent checkpoint ID.

Moreover, in some embodiments, the metadata checkpoint management system 250 is configured to create a checkpoint through a checkpoint creation process that has distinct phases of operation, which are referred to herein as a "define" phase, and a "persist" phase. There is some flexibility when determining that changes are included in the current checkpoint and what changes are left for the next checkpoint. However, the checkpoint must adhere to the following rules. For example, a change that is included in the checkpoint must be removed from the write cache, and a change not in the checkpoint must not be removed from the write cache. In addition, given that changes are likely to update multiple metadata structures, a checkpoint must not be taken when a change is applied to only some of the metadata structures, as this would lead to an inconsistent state.

To avoid a violation of such rules, the checkpoint process involves performing a define phase followed by a persist phase. The define phase involves waiting for changes being processed to complete, while prohibiting new changes from being processed. The define phase does not prohibit writes, it only blocks the processing that leads to metadata updates. Once the define phase is complete, the persist phase is performed to write all the dirty pages of the checkpoint to storage. This may be a long process, but there are no longer any blocks on metadata updates because all new updates are separated using a new checkpoint ID.

Figure 3:
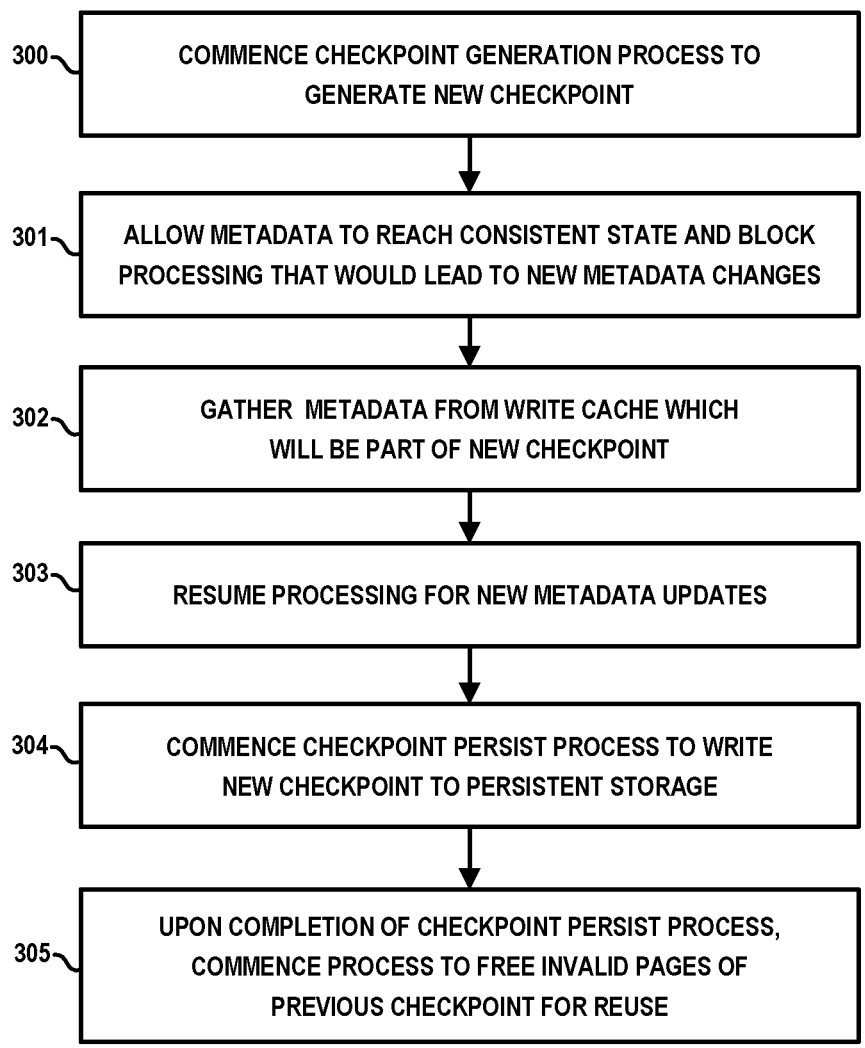
FIG. 3 illustrates a flow diagram of a method for generating a metadata checkpoint, according to an exemplary embodiment of the disclosure.

FIG. 3 illustrates a flow diagram of a method for generating a metadata checkpoint, according to an exemplary embodiment of the disclosure. In some embodiments, the process flow of FIG. 3 illustrates an exemplary mode of operation of the metadata checkpoint management system 250 of FIG. 2 and thus, for illustrative purposes, the process of FIG. 3 may be discussed in the context of system module/components shown in FIG. 2. The metadata checkpoint management system 250 will commence a checkpoint generation process to generate a new checkpoint (block 300). The checkpoint generation process can be triggered by one or more predetermined events.

For example, in an exemplary embodiment where checkpoints are generated for metadata items that are initially persisted in the persistent write cache 272, a checkpoint operation can be commenced when the amount of new metadata items in the persistent write cache 272 (e.g., number of metadata items) has reached a threshold amount (or number) of metadata items. The persistent write cache 272 provides resiliency of the metadata items before the metadata is destaged and persisted in metadata checkpoints. In this regard, it is preferable to limit the amount metadata that is contained in the write cache to limit the cost of recovering lost RAM metadata in the event of a failure, as recovery involves reading the persistent write cache 272, parsing through the items in the write cache, and replaying the items one at a time to reconstruct lost RAM metadata.

As noted above, an initial phase of the checkpoint generation process comprises a "define" phase. In some embodiments, the define phase comprises allowing the metadata to reach a consistent state and blocking any processing that would lead to new metadata updates (block 301), and gathering metadata from the write cache which will be included in the new checkpoint (block 302). As noted above, the define phase involves waiting for changes being processed to complete, while prohibiting new changes from being processed, to thereby prevent inconsistent metadata states. Again, the define phase does not prohibit writes, it only blocks the processing that leads to metadata updates. Further, in some embodiments, gather metadata from the write cache involves destaging a plurality of selected metadata items from the write cache by copying the selected metadata items from the write cache into RAM, and leaving such selected items in the write cache until the checkpoint operation is complete. Upon completion of the define phase, I/O processing is resumed to allow metadata updates (block 303).

Once the define phase is complete and IO are resumed, the metadata checkpoint management system 250 will commence a persist phase of the checkpoint generation to write the checkpoint to persistent storage (block 304). The persist phase is performed to write all the dirty pages of the checkpoint to storage. During the persist phase, there are no longer any locks on metadata updates while the checkpoint is being persisted. As such, the overall checkpoint generation process minimizes the scope of the locking (e.g., only metadata updates) and the duration of the locking. Upon completion of the checkpoint persist process, the metadata checkpoint management system 250 can commence a process to free invalid pages of a previous checkpoint for reuse (block 305), the details of which will be explained in further detail below.

Once the define phase is complete and IO are resumed, there may be metadata in RAM that is relevant to a checkpoint being persisted, and there will be metadata in RAM that is relevant only to a next current checkpoint being generated. The metadata checkpoint management system 250 implements methods to separate such checkpoint metadata in RAM. For example, separation is accomplished using a side copy process or a page branching process. A side copy process comprises gathering relevant metadata and copying the metadata aside for the checkpoint to store. The side copy process is performed prior to resuming metadata updates. The original fields may be modified by new changes. The side copy process is particularly useful for small amounts of metadata such as high-level checkpoint parameters, which will limit the RAM consumption.

Figure 4:
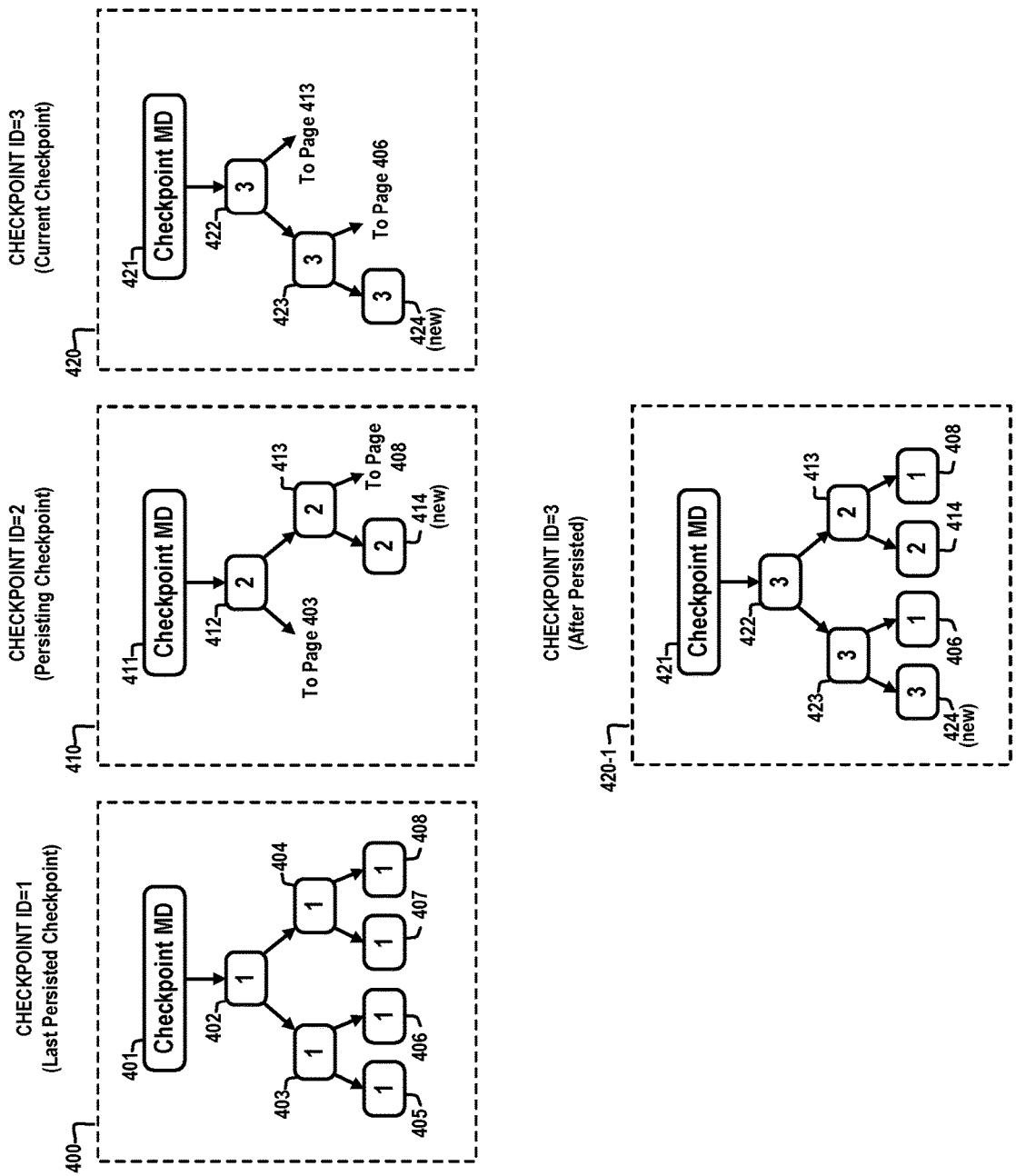
FIG. 4 schematically illustrates a process for a generating a metadata checkpoint using a metadata page branching process, according to according to an exemplary embodiment of the disclosure.

On the other hand, a page branching allows modifying only specific areas of a metadata checkpoint tree structure. For example, FIG. 4 schematically illustrates a process for a generating a metadata checkpoint using a metadata page branching process, according to according to an exemplary embodiment of the disclosure. FIG. 4 illustrates exemplary metadata checkpoint tree structures 400, 410, 420, and 420-1. The metadata checkpoint tree structure 400 represents a last persisted checkpoint with a checkpoint ID=1. The metadata checkpoint tree structure 410 represents a checkpoint with a checkpoint ID=2 which is in the process of being persisted (e.g., persist phase). The metadata checkpoint tree structure 420 represents a new checkpoint with a checkpoint ID=3, which is currently being generated in RAM (define phase). The metadata checkpoint tree structure 420-1 represents a persisted version of the metadata checkpoint tree structure 420 following completion of a persist phase in which the checkpoint is stored to persistent storage/memory. The metadata checkpoint tree structures can be implemented using any type of tree structure which is suitable for the given application (e.g., general tree structure, B-tree structure, binary tree structure, etc.)

The metadata checkpoint tree structure 400 comprises a commit page 401, a root page 402, inner pages 403 and 404, and leaf pages 405, 406, 407, and 408. The pages in the metadata checkpoint tree structure 400 are shaded to represent that such pages are persisted. The pages in the metadata checkpoint tree structure 400 are labeled with the checkpoint ID=1 of the metadata checkpoint tree structure 400. The commit page 401 maintains checkpoint metadata associated with checkpoint with the checkpoint ID=1. The pages 402, 403, 404, 405, 406, 407, and 408 comprise pages of metadata that are persisted in the metadata checkpoint tree structure 400 with the checkpoint ID=1.

The metadata checkpoint tree structure 410 represents a checkpoint that has completed the "define" phase and is in a "persist" phase. The metadata checkpoint tree structure 410 comprises a commit page 411, a root page 412, an inner page 413, and leaf page 414. The pages 411, 412, 413, and 414 in the metadata checkpoint tree structure 410 are unshaded to represent that such pages are in RAM and in the process of being persisted. The pages 411, 412, 413, and 414 in the metadata checkpoint tree structure 410 are labeled with the checkpoint ID=2 of the metadata checkpoint tree structure 410. The commit page 411 maintains checkpoint metadata associated with checkpoint with the checkpoint ID=2. The pages 412, 413, and 414 comprise pages of metadata that have changed due to new writes to the data storage system, resulting in changes to pages of the last persisted metadata checkpoint tree structure 400 with checkpoint ID=1. In this regard, the updated/modified pages 412, 413, and 414 of the metadata checkpoint tree structure 410 need to be stored as part of the persist process.

On the other hand, the pages of the last persisted metadata checkpoint tree structure 400 (checkpoint ID=1) which have not changed, can be included in the new metadata checkpoint tree structure 410 by reference (e.g., using pointers). For example, as shown in FIG. 4, the page 412 has a left pointer that points to the page 403 of the last persisted metadata checkpoint tree structure 400 (checkpoint ID=1). In addition, the page 413 has a pointer which points to the page 408 of the last persisted metadata checkpoint tree structure 400 (checkpoint ID=1). This allows the metadata checkpoint tree structure 410 (checkpoint ID=2) to include the already persisted pages 403, 405, 406, and 408 of the last persisted metadata checkpoint tree structure 400 (checkpoint ID=1), and thereby eliminate duplicate copies of the pages 403, 405, 406, and 408 from being persisted with both metadata checkpoint tree structures 400 and 410.

The metadata checkpoint tree structure 420 represents an open checkpoint that is in the process of being generated, and has not yet been frozen for performing the persist phase. In this regard, the metadata checkpoint tree structure 420 represents an open checkpoint that is accepting new writes, and where no lock has yet been taken for the define phase. The metadata checkpoint tree structure 420 comprises a commit page 421, a root page 422, an inner page 423, and leaf page 424. The pages 421, 422, 423, and 424 in the metadata checkpoint tree structure 420 are unshaded to represent that such pages are in RAM and not yet persisted. The pages 421, 422, 423, and 424 in the metadata checkpoint tree structure 420 are labeled with the checkpoint ID=3 of the metadata checkpoint tree structure 420. The commit page 421 maintains checkpoint metadata associated with checkpoint being generated with the checkpoint ID=3. The pages 422, 423, and 424 comprise pages of metadata that have changed due to new writes to the data storage system, resulting in changes to pages of the metadata checkpoint tree structure 410 (checkpoint ID=2) which is in the persist phase. In this regard, the updated/modified pages 422, 423, and 424 of the metadata checkpoint tree structure 420 need to be stored as part of a subsequent persist process.

On the other hand, the pages of the last persisted metadata checkpoint tree structure 400 (checkpoint ID=1), and frozen (yet persisting) metadata checkpoint tree structure 410 (checkpoint ID=2) which have not changed, can be included in the new metadata checkpoint tree structure 420 by reference (e.g., using pointers). For example, as shown in FIG. 4, the page 422 has a right pointer that points to the page 413 of the currently persisting metadata checkpoint tree structure 410 (checkpoint ID=2). In addition, the page 423 has a pointer which points to the page 406 of the last persisted metadata checkpoint tree structure 400 (checkpoint ID=1). This allows the new metadata checkpoint tree structure 420 (checkpoint ID=3) to include the already persisted pages 406 and 408 of the last persisted metadata checkpoint tree structure 400 (checkpoint ID=1), as well as the pages 413 and 414 of the frozen (yet persisting) metadata checkpoint tree structure 410 (checkpoint ID=2), and thereby eliminate duplicate copies of the pages 406, 408, 413, and 414 from being persisted with all the metadata checkpoint tree structures 400, 410, and 420.

The metadata checkpoint tree structure 420-1 represents the metadata checkpoint tree structure 420 (checkpoint ID=3) following a persist phase where the checkpoint tree structure 420 has been persisted. The persisted metadata checkpoint tree structure 420-1 shows the resulting page branching structure that results from the new metadata checkpoint tree structure 420-1 (checkpoint ID=3) including the pages 406 and 408 of the metadata checkpoint tree structure 400 (checkpoint ID=1), and the pages 413 and 414 of metadata checkpoint tree structure 410 (checkpoint ID=2).

FIG. 4 schematically illustrates an exemplary page branching process that allows modification of specific pages of a metadata checkpoint tree structure while referencing unchanged pages from previous checkpoint tree structures. A page that undergoes a change will have a new copy of the page made. If the page is part of a tree structure, the page's ancestors will be modified as well to point to the new child page. If the page being changed is not a leaf page, it will still point to all the same child pages that were not modified. Page branching only takes place if the ID of the metadata page being modified is lower than the current checkpoint ID. If the ID is the same, the page is not persisted, and it can be updated in place in RAM. FIG. 4 further illustrates a checkpoint process in which a "persist" phase for a checkpoint can be performed concurrently with a "define" phase for a new checkpoint. In the event of failure, recovery can be performed using the last persisted checkpoint 400.

As noted above, once a new checkpoint is created, a process can be commenced to free pages of a previous checkpoint. As previously discussed, a new checkpoint can reuse unreferenced pages of a previous checkpoint and replace modified pages with new pages. Once a checkpoint process is complete, the invalidated pages from a previous checkpoint should be freed. This process is not as simple as freeing the entire previous checkpoint because most of the pages are reused. As part of a checkpoint's metadata (e.g., commit page), the checkpoint must track the pages that have been invalidated as part of the standard write flow. These pages cannot be used until the current checkpoint is committed and the previous checkpoint is no longer needed. This list of pages is persisted as part of the checkpoint. Once the checkpoint is committed, the pages can be reused. The process of allocating pages, freeing pages, reusing pages, etc., for a metadata checkpoint structure is controlled by operation of the block/page allocation lifecycle management module 256 (FIG. 2), which will now be discussed in further detail in conjunction with FIG. 5.

Figure 5:
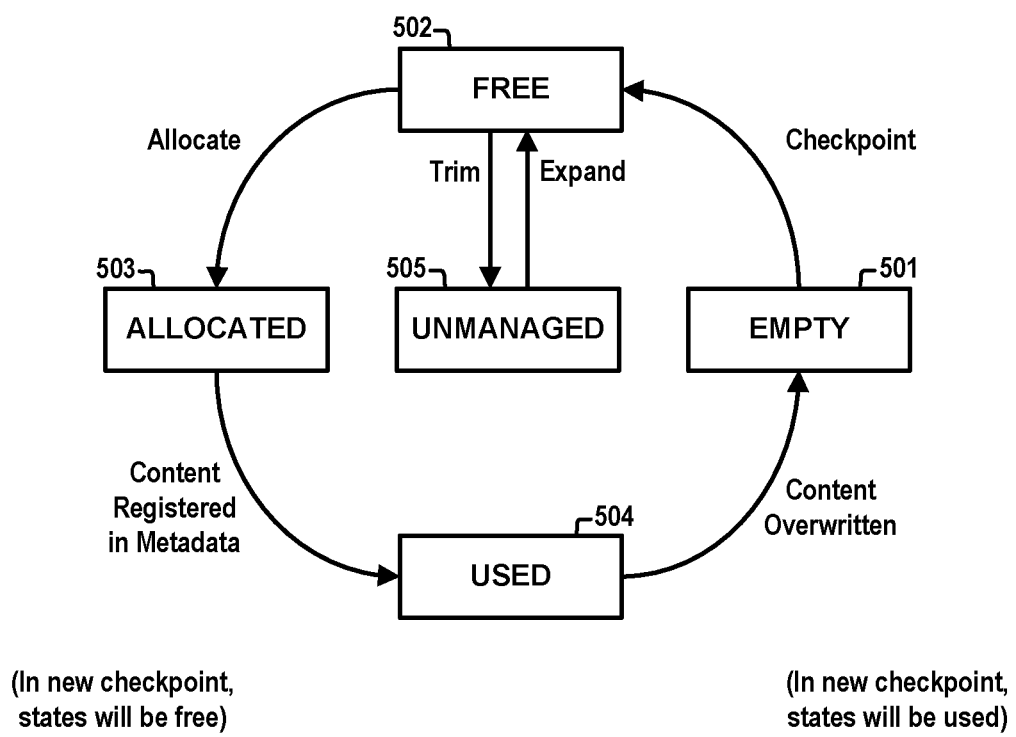
FIG. 5 schematically illustrates a page allocation lifecycle management process to provide checkpoint consistency, according to an exemplary embodiment of the disclosure.

FIG. 5 schematically illustrates a page allocation lifecycle management process to provide checkpoint consistency, according to an exemplary embodiment of the disclosure. More specifically, FIG. 5 schematically illustrates a page allocation lifecycle management process 500 having various states including an empty state 501, a free state 502, an allocated state 503, a used state 504, and an unmanaged state 505. The page allocation lifecycle management process 500 is configured to ensure consistency of a checkpoint by differentiating between the different states for, e.g., allocating metadata pages, freeing metadata pages, etc. The page allocation lifecycle management process 500 provides a clear delineation between states of a block or page being "used" (used state 504) or being "free" (free state 502), wherein the delineated states are consistent across both the data path and the recovery process from a checkpoint.

For example, as shown in FIG. 4, the metadata checkpoint tree structure 410 (checkpoint ID=2) has a root page 412 which is a modified (overwritten) version of the root page 402 of the persisted metadata checkpoint tree structure 400 (checkpoint ID=1). In this regard, it may be that the root page 402 is considered to be "free." But if there is a failure before the metadata checkpoint tree structure 410 (checkpoint ID=2) persist phase is complete, recovery will take place using the persisted metadata checkpoint tree structure 400 (checkpoint ID=1). As such, the pages of the persisted metadata checkpoint tree structure 400 will be needed, despite the fact that some of the pages were overwritten in the pending metadata checkpoint tree structure 410 (checkpoint ID=2). As such, the pages of the persisted metadata checkpoint tree structure 400, which have been overwritten in the metadata checkpoint tree structure 410 (checkpoint ID=2), cannot be freed until they are no longer needed.

In this regard, when a block/page is no longer used and is "empty" (e.g., a used block has content that was overwritten, causing a transition to the empty state 501), the "empty" block/page will not be reused until a checkpoint persists the block/page as free (e.g., transition from empty state 501 to free state 502). This is to avoid the scenario in which the block/page is reused, recovery then takes place, and the previous checkpoint expects the block/page to contain the original data, but unfortunately it was overwritten. To address this issue, the empty state 501 is disposed in the path from the used state 504 to the free state 502. A block in the empty state 501 no longer contains any data, but it may not be allocated until the next checkpoint. After the next checkpoint, all pages/blocks in the empty state 501 will transition to the free state 502.

There is a similar issue in the transition from the free state 502 to the used state 504. When a free block/page is allocated for use, the free block/page is removed from the free state 502 and transitions to the allocated state 503, which prevents the given block/page from being allocated again. On the other hand, there is a period of time between the allocation and the time the block/page is filled/written to, and its content is indexed in metadata that will be included in the checkpoint, after which the block/page enters the used state 504 (transition from allocated state 503 to used state 504). For this transitional phase, the block/page is maintained in the allocated state 503. In the allocated state 503, the block/page is marked allocated for use in checkpoints (and cannot be allocated to another process), but not be included in a checkpoint for some time following allocation (the block will be free after a recovery). The unmanaged state 505 is utilized to allow the addition (expand) or removal (trim) of blocks/pages from the page allocation lifecycle management process 500. A block/page that is in the unmanaged state 505 is marked as such and treated as is does not exist for use in generating metadata checkpoints.

Figure 6:
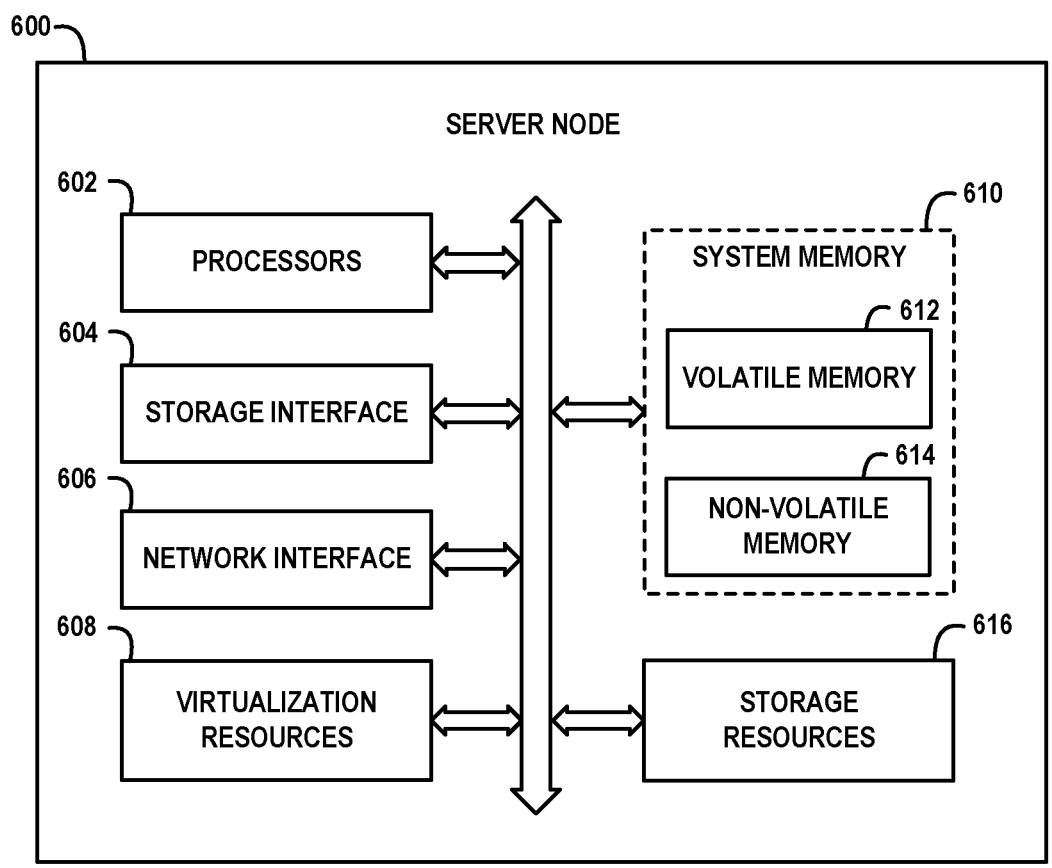
FIG. 6 schematically illustrates a framework of a server node for hosting a storage node which comprises a metadata checkpoint management system, according to an exemplary embodiment of the disclosure.

FIG. 6 schematically illustrates a framework of a server node 600 for hosting a storage node which comprises a metadata checkpoint management system, according to an exemplary embodiment of the disclosure. The server node 600 comprises processors 602, storage interface circuitry 604, network interface circuitry 606, virtualization resources 608, system memory 610, and storage resources 616. The system memory 610 comprises volatile memory 612 and non-volatile memory 614. The processors 602 comprise one or more types of hardware processors that are configured to process program instructions and data to execute a native operating system (OS) and applications that run on the server node 600.

For example, the processors 602 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 604 enables the processors 602 to interface and communicate with the system memory 610, the storage resources 616, and other local storage and off-infrastructure storage media, using one or more standard communication and/or storage control protocols to read data from or write data to volatile and non-volatile memory/storage devices. Such protocols include, but are not limited to, NVMe, PCIe, PATA, SATA, SAS, Fibre Channel, etc. The network interface circuitry 606 enables the server node 600 to interface and communicate with a network and other system components. The network interface circuitry 606 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 608 can be instantiated to execute one or more services or functions which are hosted by the server node 600. For example, the virtualization resources 608 can be configured to implement the various modules and functionalities of a storage control system and a metadata checkpoint management system as discussed herein. In some embodiments, the virtualization resources 608 comprise virtual machines that are implemented using a hypervisor platform which executes on the server node 600, wherein one or more virtual machines can be instantiated to execute functions of the server node 600. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 600, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In another embodiment, the virtualization resources 608 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 600 as well execute one or more of the various modules and functionalities of a storge control system as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

In some embodiments, the constituent components and modules of the storage nodes and storage control systems as discussed herein, as well as the metadata checkpoint management methods as discussed herein, are implemented using program code that is loaded into the system memory 610 (e.g., volatile memory 612), and executed by the processors 602 to perform respective functions as described herein. In this regard, the system memory 610, the storage resources 616, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 610 comprises various types of memory such as volatile RAM, NVRAM, or other types of memory, in any combination. The volatile memory 612 may be a dynamic random-access memory (DRAM) (e.g., DRAM DIMM (Dual In-line Memory Module), or other forms of volatile RAM. The non-volatile memory 614 may comprise one or more of NAND Flash storage devices, SSD devices, or other types of next generation non-volatile memory (NGNVM) devices. The system memory 610 can be implemented using a hierarchical memory tier structure wherein the volatile memory 612 is configured as the highest-level memory tier, and the non-volatile memory 614 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 602 to execute a native operating system and one or more applications or processes hosted by the server node 600, and to temporarily store data that is utilized and/or generated by the native OS and application programs and processes running on the server node 600. The storage resources 616 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A method, comprising:
    writing, by a storage control system, metadata to a persistent write cache; and
    performing, by the storage control system, a checkpoint generation process to generate a new metadata checkpoint which includes at least a portion of the metadata in the persistent write cache, wherein the checkpoint generation process comprises:
        placing a lock on processing to enable metadata in the persistent write cache to reach a consistent state;
        creating a metadata checkpoint structure in memory;
        removing the lock on processing to allow metadata updates in the persistent write cache;
        destaging at least a portion of the metadata from the persistent write cache to the metadata checkpoint structure; and
        persistently storing the metadata checkpoint structure.

2. The method of claim 1, further comprising updating metadata in the persistent write cache while the metadata checkpoint structure is being persistently stored.

3. The method of claim 1, wherein creating the metadata checkpoint structure in memory comprises:
    assigning a unique checkpoint identifier (ID) value to the metadata checkpoint structure for the new metadata checkpoint;
    storing the destaged metadata in one or more pages of a tree structure of the metadata checkpoint structure; and
    adding at least one pointer to at least one page of the tree structure which points to a page of a previous metadata checkpoint structure having a unique checkpoint ID value which is less than the assigned checkpoint ID value of the metadata checkpoint structure for the new metadata checkpoint.

4. The method of claim 3, wherein storing the destaged metadata in one or more pages of a tree structure of the metadata checkpoint structure comprises overwriting at least one modified page of a tree structure of a previous metadata checkpoint structure with the destaged metadata.

5. The method of claim 3, wherein the at least one pointer points to a page of a previous metadata checkpoint structure which is in a process of being persisted.

6. The method of claim 3, wherein:
    creating the metadata checkpoint structure in memory further comprises generating a commit page for the metadata checkpoint structure;
    the commit page comprises metadata associated with the new metadata checkpoint, which is utilized to place the new metadata checkpoint into effect and expire a previous checkpoint; and
    the method further comprises atomically writing the commit page to persistent storage to place the new metadata checkpoint into effect.

7. The method of claim 6, wherein the metadata of the commit page comprises at least one or more of: (i) the assigned checkpoint ID value; (ii) page identifiers pages of root pages of metadata; (iii) a cutoff point in the persistent write cache up until which all metadata items are included in the new metadata checkpoint, and from which recovery begins after a failure; and (iv) a list of pages freed by a previous metadata checkpoint.

8. The method of claim 1, further comprising managing, by the storage control system, an allocation lifecycle of pages that are utilized to store metadata in metadata checkpoints, wherein the allocation lifecycle of a given page comprises one of a plurality of states, wherein the plurality of states comprises an empty state, a free state, an allocated state, and a used state.

9. An article of manufacture comprising a non-transitory processor-readable storage medium having stored therein program code of one or more software programs, wherein the program code is executable by one or more processors to implement a method which comprises:
    writing, by a storage control system, metadata to a persistent write cache; and
    performing, by the storage control system, a checkpoint generation process to generate a new metadata checkpoint which includes at least a portion of the metadata in the persistent write cache, wherein the checkpoint generation process comprises:
        placing a lock on processing to enable metadata in the persistent write cache to reach a consistent state;
        creating a metadata checkpoint structure in memory;
        removing the lock on processing to allow metadata updates in the persistent write cache;
        destaging at least a portion of the metadata from the persistent write cache to the metadata checkpoint structure; and
        persistently storing the metadata checkpoint structure.

10. The article of manufacture of claim 9, further comprising program code for updating metadata in the persistent write cache while the metadata checkpoint structure is being persistently stored.

11. The article of manufacture of claim 9, wherein the program code for creating the metadata checkpoint structure in memory comprises program code for:
    assigning a unique checkpoint identifier (ID) value to the metadata checkpoint structure for the new metadata checkpoint;
    storing the destaged metadata in one or more pages of a tree structure of the metadata checkpoint structure; and
    adding at least one pointer to at least one page of the tree structure which points to a page of a previous metadata checkpoint structure having a unique checkpoint ID value which is less than the assigned checkpoint ID value of the metadata checkpoint structure for the new metadata checkpoint.

12. The article of manufacture of claim 11, wherein the program code for storing the destaged metadata in one or more pages of a tree structure of the metadata checkpoint structure comprises program code for overwriting at least one modified page of a tree structure of a previous metadata checkpoint structure with the destaged metadata.

13. The article of manufacture of claim 11, wherein the at least one pointer points to a page of a previous metadata checkpoint structure which is in a process of being persisted.

14. The article of manufacture of claim 11, wherein:
the program code for creating the metadata checkpoint structure in memory further comprises program code for generating a commit page for the metadata checkpoint structure;
the commit page comprises metadata associated with the new metadata checkpoint, which is utilized to place the new metadata checkpoint into effect and expire a previous checkpoint; and
further comprising program code for atomically writing the commit page to persistent storage to place the new metadata checkpoint into effect.

15. The article of manufacture of claim 14, wherein the metadata of the commit page comprises at least one or more of: (i) the assigned checkpoint ID value; (ii) page identifiers pages of root pages of metadata; (iii) a cutoff point in the persistent write cache up until which all metadata items are included in the new metadata checkpoint, and from which recovery begins after a failure; and (iv) a list of pages freed by a previous metadata checkpoint.

16. The article of manufacture of claim 9, further comprising program code for managing, by the storage control system, an allocation lifecycle of pages that are utilized to store metadata in metadata checkpoints, wherein the allocation lifecycle of a given page comprises one of a plurality of states, wherein the plurality of states comprises an empty state, a free state, an allocated state, and a used state.

17. An apparatus comprising:
at least one processor; and
memory configured to store program code, wherein the program code is executable by the at least one processor to instantiate a storage control system, wherein the storage control system is configured to:
write metadata to a persistent write cache; and
perform a checkpoint generation process to generate a new metadata checkpoint which includes at least a portion of the metadata in the persistent write cache, wherein in performing the checkpoint generation process, the storage control system is configured to:
place a lock on processing to enable metadata in the persistent write cache to reach a consistent state;
create a metadata checkpoint structure in memory;
remove the lock on processing to allow metadata updates in the persistent write cache;
destage at least a portion of the metadata from the persistent write cache to the metadata checkpoint structure; and
persistently store the metadata checkpoint structure.

18. The apparatus of claim 17, wherein the storage control system is configured to update metadata in the persistent write cache while the metadata checkpoint structure is being persistently stored.

19. The apparatus of claim 17, wherein in creating the metadata checkpoint structure in memory, the storage control system is configured to:
assign a unique checkpoint identifier (ID) value to the metadata checkpoint structure for the new metadata checkpoint;
store the destaged metadata in one or more pages of a tree structure of the metadata checkpoint structure; and
add at least one pointer to at least one page of the tree structure which points to a page of a previous metadata checkpoint structure having a unique checkpoint ID value which is less than the assigned checkpoint ID value of the metadata checkpoint structure for the new metadata checkpoint.

20. The apparatus of claim 19, wherein:
in creating the metadata checkpoint structure in memory, the storage control system is configured to generate a commit page for the metadata checkpoint structure, wherein the commit page comprises metadata associated with the new metadata checkpoint, which is utilized to place the new metadata checkpoint into effect and expire a previous checkpoint, wherein the metadata of the commit page comprises at least one or more of: (i) the assigned checkpoint ID value; (ii) page identifiers pages of root pages of metadata; (iii) a cutoff point in the persistent write cache up until which all metadata items are included in the new metadata checkpoint, and from which recovery begins after a failure; and (iv) a list of pages freed by a previous metadata checkpoint; and
the storage control system is configured to atomically write the commit page to persistent storage to place the new metadata checkpoint into effect.

* * * * *